(No Model.)
J. W. TURNER.
SAW SWAGE.
No. 497,616. Patented May 16, 1893.
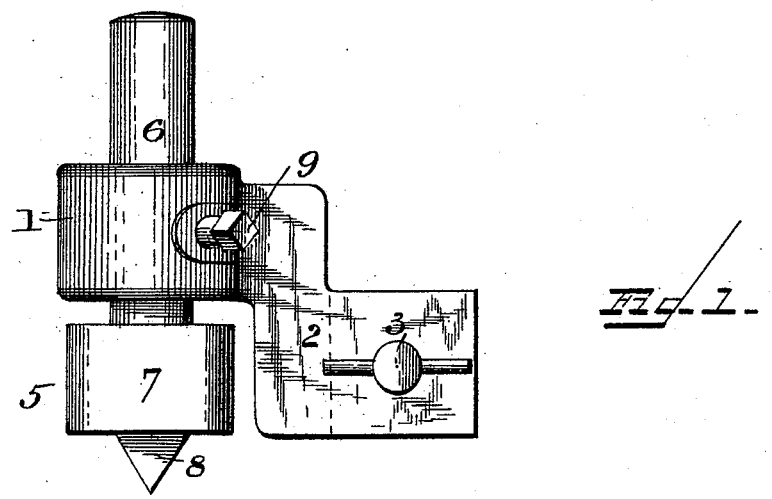
Fig. 1.
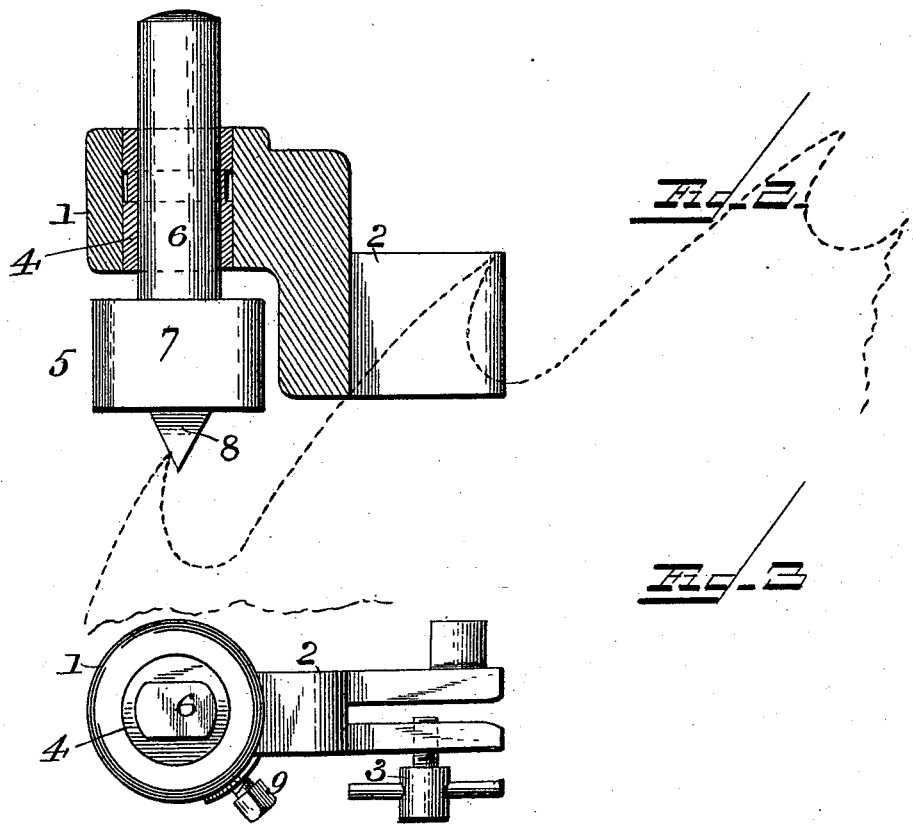
Fig. 2.
Fig. 3.
WITNESSES:
F. L. Ourand
J. V. L. Coombs
INVENTOR:
Jacob W. Turner
by Laws Bagga & Co.
Attorneys

UNITED STATES PATENT OFFICE.

JACOB W. TURNER, OF VAN WERT, OHIO, ASSIGNOR OF ONE-HALF TO THEODORE CLAPPER, OF HARTFORD CITY, INDIANA.

SAW-SWAGE.

SPECIFICATION forming part of Letters Patent No. 497,616, dated May 16, 1893.

Application filed October 15, 1892. Serial No. 448,996. (No model.)

*To all whom it may concern:*

Be it known that I, JACOB W. TURNER, a citizen of the United States, and a resident of Van Wert, in the county of Van Wert and State of Ohio, have invented certain new and useful Improvements in Saw-Swages; and I do hereby declare that the following is a full, clear, and exact description of the invention, which will enable others skilled in the art to which it appertains to make and use the same, reference being had to the accompanying drawings, which form a part of this specification.

My invention relates to improvements in saw swages, the object being to provide a device of this character which shall possess superior advantages with respect to simplicity of construction and efficiency in operation.

The invention consists in the novel construction and combination of parts hereinafter fully described and claimed.

In the accompanying drawings: Figure 1 is an elevation of my improved saw swage. Fig. 2 is a longitudinal section of the same. Fig. 3 is a plan view.

In the said drawings the reference numeral 1 designates a metal hub, formed integral with the arm 2, which is bifurcated to embrace a saw and provided with a set screw 3, to hold or secure it to the saw.

Located within the hub 1 is a rotatable sleeve 4, which fits snugly therein.

The numeral 5 denotes the punch consisting of the shank 6, collar 7, and point 8. This shank passes through the sleeve and is capable of sliding therein. The hub 1 is provided with a set-screw 9, which passes through a threaded aperture therein, and bears against the sleeve and prevents the same from rotating.

The operation will be readily understood. A saw tooth is inserted between the bifurcated ends of arms 2, and secured therein by means of thumb screw 3. The proper angle is given to the punch and by a blow of a hammer it is forced upon the tooth adjoining the tooth to which the swage is secured, giving it the required set. It will be noted that by means of the rotatable sleeve and the set screw the punch may be adjusted at different angles, as circumstances may require. It will also be noted that by means of the bifurcated arms and set screw the device can be firmly secured to a saw so as to keep it square therewith.

Having thus described my invention, what I claim is—

A saw swage comprising the hub, the rotatable sleeve, the punch passing therethrough, the set screw and the bifurcated arm made integral with said hub, provided with a thumb screw, substantially as described.

In testimony that I claim the foregoing as my own I have hereunto affixed my signature in presence of two witnesses.

JACOB W. TURNER.

Witnesses:
ENOCH CONNER,
GEO. E. WELLS.